US009717972B2

(12) United States Patent
Stanton

(10) Patent No.: US 9,717,972 B2
(45) Date of Patent: Aug. 1, 2017

(54) GOLF TRAINING APPARATUS

(71) Applicant: Arthur David Stanton, Garland, TX (US)

(72) Inventor: Arthur David Stanton, Garland, TX (US)

( * ) Notice: Subject to any disclaimer, the term of this patent is extended or adjusted under 35 U.S.C. 154(b) by 266 days.

(21) Appl. No.: 14/794,922

(22) Filed: Jul. 9, 2015

(65) Prior Publication Data

US 2017/0007903 A1    Jan. 12, 2017

(51) Int. Cl.
  *A63B 69/36*  (2006.01)
  *G09B 19/00*  (2006.01)
  *A63B 71/06*  (2006.01)

(52) U.S. Cl.
  CPC ...... *A63B 69/3667* (2013.01); *G09B 19/0038* (2013.01); *A63B 71/0622* (2013.01); *A63B 2071/0625* (2013.01); *A63B 2207/02* (2013.01); *A63B 2208/0204* (2013.01); *A63B 2220/30* (2013.01); *A63B 2220/34* (2013.01); *A63B 2220/40* (2013.01); *A63B 2220/44* (2013.01); *A63B 2220/802* (2013.01); *A63B 2220/805* (2013.01); *A63B 2220/89* (2013.01)

(58) Field of Classification Search
  USPC ........................................................ 473/257
  See application file for complete search history.

(56) References Cited

U.S. PATENT DOCUMENTS

| 3,000,261 | A |   | 9/1961 | Frenkel |  |
|---|---|---|---|---|---|
| 3,975,024 | A |   | 8/1976 | Stephan |  |
| 4,451,043 | A |   | 5/1984 | Ogawa |  |
| 5,005,837 | A |   | 4/1991 | Urra Martinez |  |
| 5,016,885 | A |   | 5/1991 | Quigley |  |
| 5,882,204 | A | * | 3/1999 | Iannazo | A63B 24/0021 434/247 |
| 9,211,439 | B1 | * | 12/2015 | Pedenko | A63B 24/0006 |
| 2006/0105849 | A1 | * | 5/2006 | Brunner | A63B 69/3614 473/131 |
| 2006/0128492 | A1 | * | 6/2006 | Hourihan | A63B 69/3685 473/257 |
| 2013/0331195 | A1 | * | 12/2013 | Sery | A63B 69/365 473/223 |
| 2014/0155187 | A1 | * | 6/2014 | Spelman | A63B 69/3676 473/220 |

(Continued)

*Primary Examiner* — Masud Ahmed
(74) *Attorney, Agent, or Firm* — Baker Law Firm

(57) ABSTRACT

A golf training apparatus which provides technical information not inclusive of proper stance in relationship to the ball placement correcting poor foot alignment, speed and angle of proper golf club swing, proper foot placement, proper stance, club control, and targeted site alignment information to the golfer. The apparatus provides a straight line of site to the intended target to be hit by the golf ball projectile and simultaneously indicates proper position of the ball in relationship to the target to be hit, the golfer's feet and stance. Proper ball placement is determined by intersecting laser beams. Embodiments of the invention will determine the proper swing, distance between the foot and the rail and the ball and the rail by ultrasonic transducers, ultrasonic sensors, and accelerometers. The information of proper foot placement, stance, and swing will be communicated to the golfer by gradient colored light indicators, and digital information display.

11 Claims, 4 Drawing Sheets

(56) References Cited

U.S. PATENT DOCUMENTS

| | | | |
|---|---|---|---|
| 2014/0248971 A1* | 9/2014 | Reid .................. | A63B 69/3667 473/266 |
| 2015/0065271 A1* | 3/2015 | Peterson ............ | A63B 24/0075 473/406 |

* cited by examiner

GOLF TRAINING APPARATUS

FIELD OF THE INVENTION

This invention relates to golf practice and more particularly an apparatus to assist with improving a golfer's consistency in the arc and swing, stance, foot position with the goal to allow the novice to become a professional golfer.

BACKGROUND OF THE INVENTION

Golf is a game in which a player using special clubs attempts to sink a ball with as few strokes as possible into each of the nine to eighteen successive holes on a golf course.

The origins of golf are uncertain and hotly debated. However, it is generally accepted that modern golf developed in Scotland during the Middle Ages. The game did not find international popularity until the late 19th century, when it spread into the rest of the United Kingdom and then to the British Empire and the United States.

The modern game of golf is generally considered to be a Scottish invention. Today golf is a big business and widely popular sport. Golfers spend hours upon hours of training. The goal of this golf training apparatus is to assist anyone from the novice golfer to the advanced golfer to achieve the level of a professional golfer.

SUMMARY OF THE INVENTION

The present invention surpasses the other golf training devices in that it assists precise alignment of the golfer's feet in relationship to the ball and in further relationship to the straight line pointing to the destination target. Moreover, the golf training system will detect and receive information that will evaluate the speed and accuracy of the golfer's swing, will inform the golfer of the achievable distance of golf ball travel based upon speed of swing and provide information to golfer on how to improve swing, foot stance. Further, the apparatus stores golf session information in the computer system and then that session information is available to the golfer for further evaluation and progress reports.

The embodiments of the golf training system can be carried by the golfer as it will fit into a standard size golf bag. The golfer will remove the golf training system from his/her golf bag and lay it on the ground pointing at the destination target. The practicing golfer will use the embedded sighting optics within the golf training system that allows the practicing golfer to look through the cross hairs of the sighting optics to align the golf training system on center line of the destination target.

The golfer will trigger a switch to active the system. After placing the golf ball in the location determined by the golf training system, the golfer will approach the golf training system rail base and align his feet and stance as determined by the laser positioning unit. The feet and stance alignment is communicated by the computer controller to the golf user by pleasant tones if the golfers feet and stance are in the correct location. Conversely, if the foot placement and stance are not in the correct location unpleasant tones will sound with flashing red arrows directing the golfer to move one or both feet in a certain direction, to direct the golfer to adjust for either widening or narrowing the stance, moving one foot or both feet in a direction, moving the golfer's stance further back from the rail or closer to the rail. Once the proper alignment is adjusted then green lights will appear with a pleasant tone to allow the golfer to know he is now correctly aligned with the golf ball, golf training system rail base, and the destination target.

The apparatus has a readily visible information display panel upon the golf training system rail base at the base of the golfer's feet in easy view of the golfer utilizing light and sound indicators. Embodiments of the apparatus have tonal communications informing the golfer of proper foot and ball placement. Other embodiments of the apparatus have a light and/or sound board indicating proper swing communicated by color lights and/or tonal sounds.

For instance a proper swing within a desired swing trajectory path will be communicated to the golfer by a lighted display of green lights showing the golfer's recently swung correct swing trajectory path. Gradient light communication will be employed communicating the level and degree of out of tolerance of the desired swing trajectory path of the golfer's swing was. When the golfer's swing is outside of the desired swing trajectory path yellow to red lights will appear.

The furthest out of tolerance swings will be communicated by red lights. Slightly out of tolerance swings will be displayed by yellow cautionary lights. Some embodiments will have gradient information lights graduating from shades of yellow, to orange to red depicting the level of out of tolerance the swing is to the degree of desired swing trajectory path.

Some embodiments that employ tonal sounds will have more pleasant and pleasing sounds for the swings that are within the desired swing trajectory path. Likewise, unpleasant sounds will be communicated for those swings outside of the desired swing trajectory path. Some embodiments will employ both the communication of gradient lights and sounds.

Embodiments of the apparatus will have novice, intermediate, and advance settings. The novice settings will have more forgiving tolerances.

Summarizing, the golf trainer will comprise of an information gradient light display array which is placed upon the golf training system rail base, computer controller, laser positioning unit module generating intersecting laser line beams depicting golf ball placement, today's commercially available means for tracking speed to detect the moving speed of a swinging club head to produce output signals feed as input to the computer controller, a means for tracking golf club swing and angle such as by at least one ultrasonic sensor to produce output signals feed as input to the computer controller, sighting optics to allow the golfer to site the golf training system rail base to the targeted destination. The computer controller will calculate the speed of the ball hit when hit, will determine the angle of the club swing moving past the rail, determine information relating to proper stance and desired foot placement in relation to the rail, will drive the information gradient light display array, provides statistical information to the golfer through the information gradient light display array visually and audibly. The laser positioning unit module will determine the desired distance of ball placement from the golf training system rail base. Sighting optics to allow the golfer to properly align the rail along the intended flight path of the ball to the destination target.

The foregoing and other objects, features, and advantages of the invention will become more apparent from the following detailed description, which proceeds with reference to the accompanying figures wherein the scale depicted is approximate.

BRIEF DESCRIPTION OF THE DRAWING FIGURES

The advantages described herein will be more fully understood by reading an example of an embodiment in which the invention is used to advantage, referred to herein as the Detailed Description with reference to the drawings wherein.

DESCRIPTION OF THE REFERENCED NUMBERS

Figure 1:
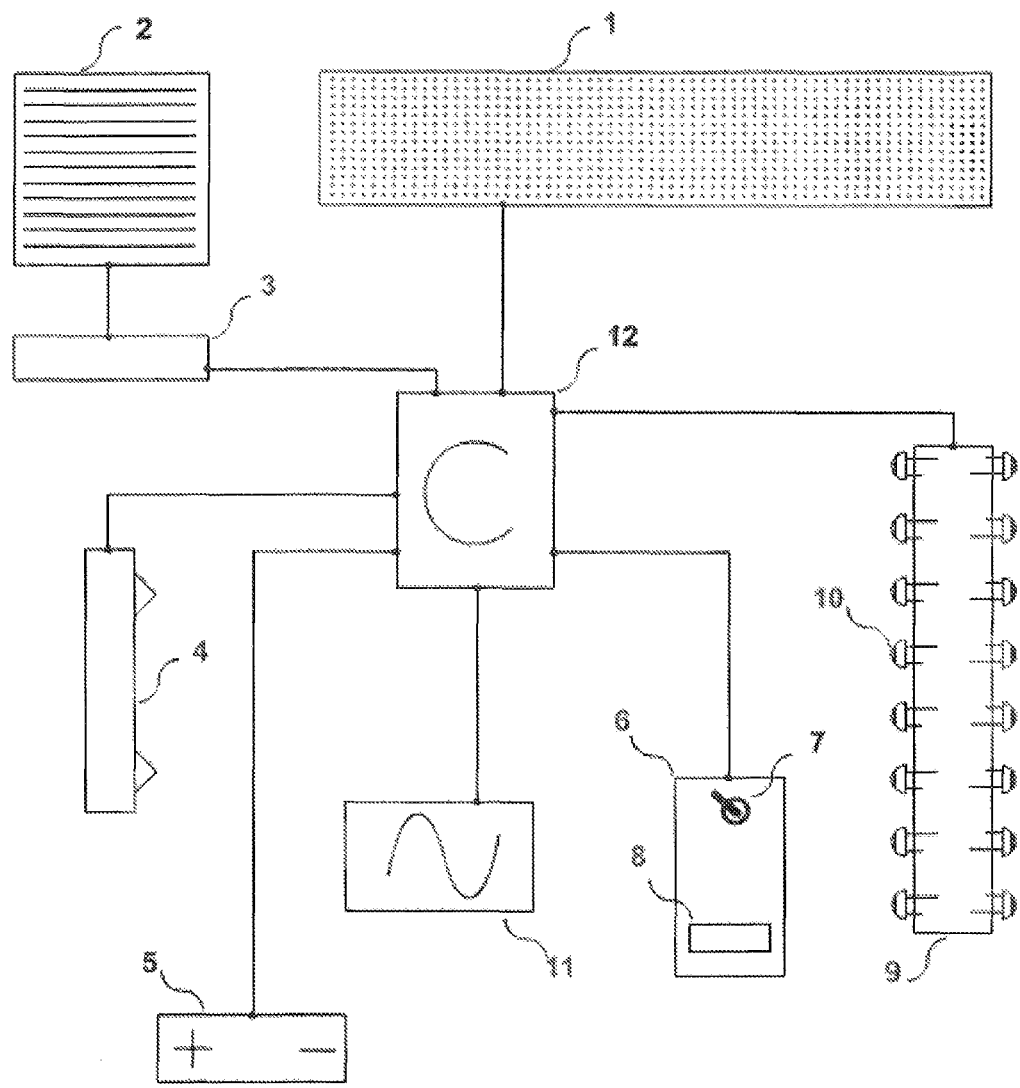
FIG. 1 is an illustrative view of the Golf Training Apparatus.
Figure 2:
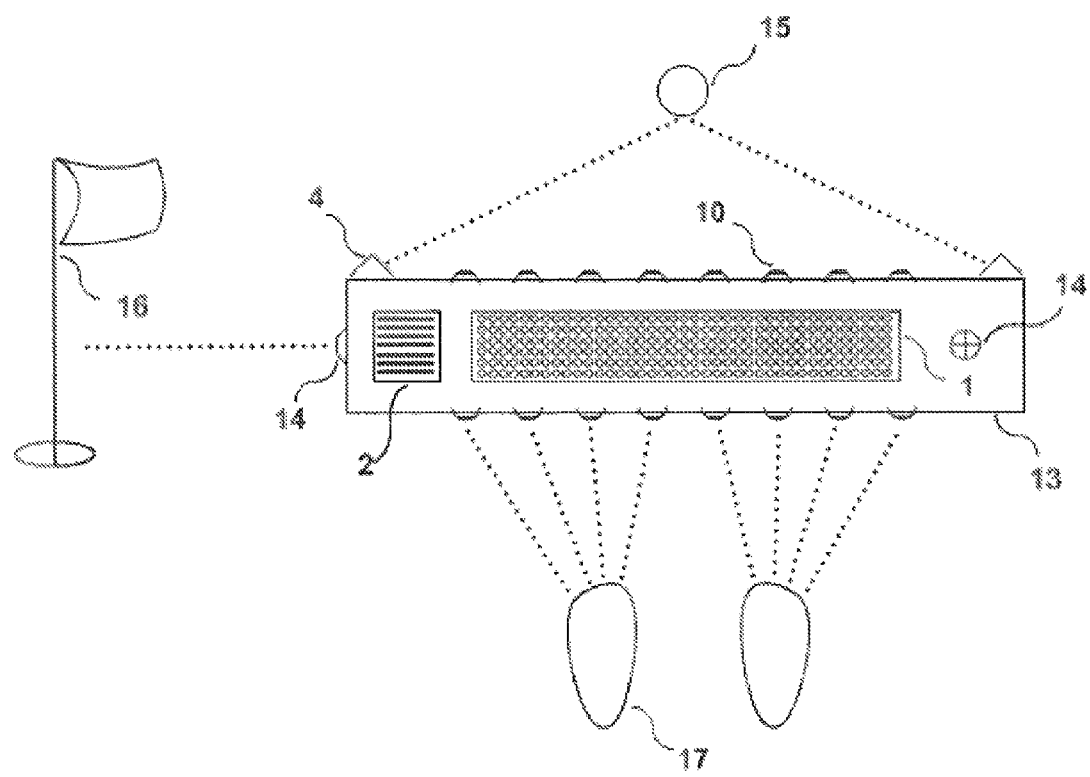
FIG. 2 is an illustrative view of the Golf Training Apparatus's alignment of the golf user, golf ball placement, golf user foot placement, and the designated target.
Figure 3:
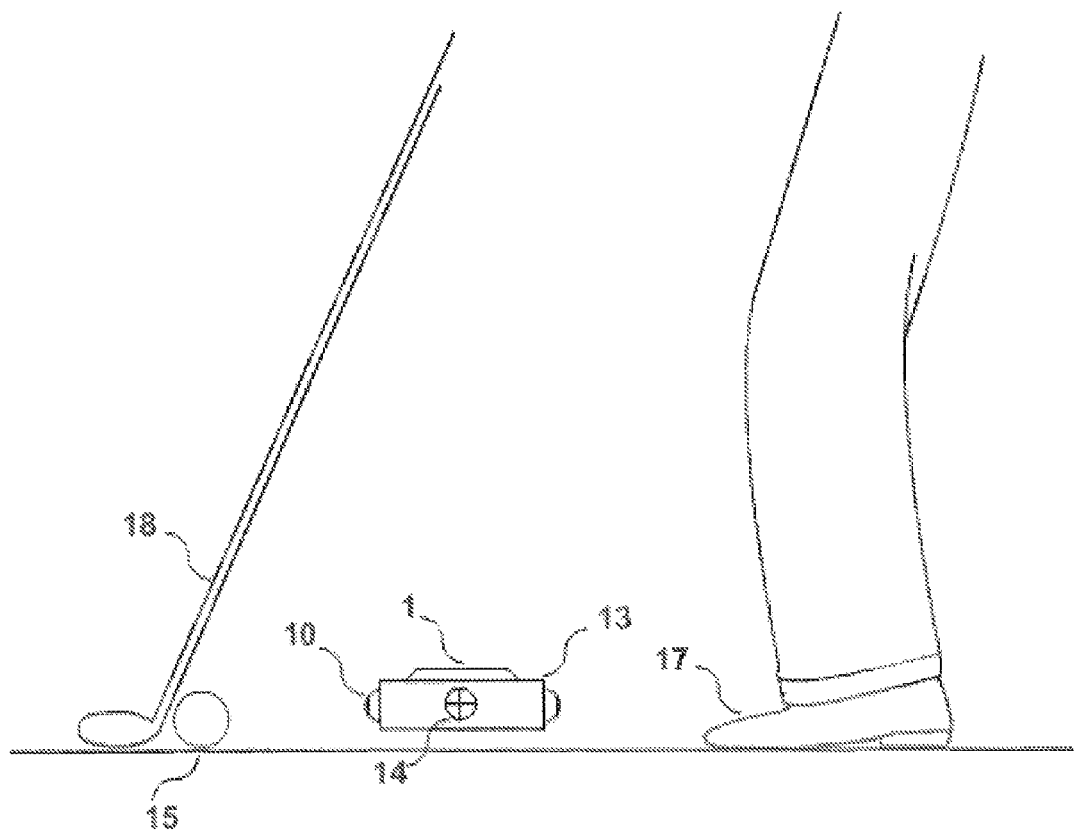
FIG. 3 is an illustrative view of the position of the unit relative to the golfer and ball.
Figure 4:
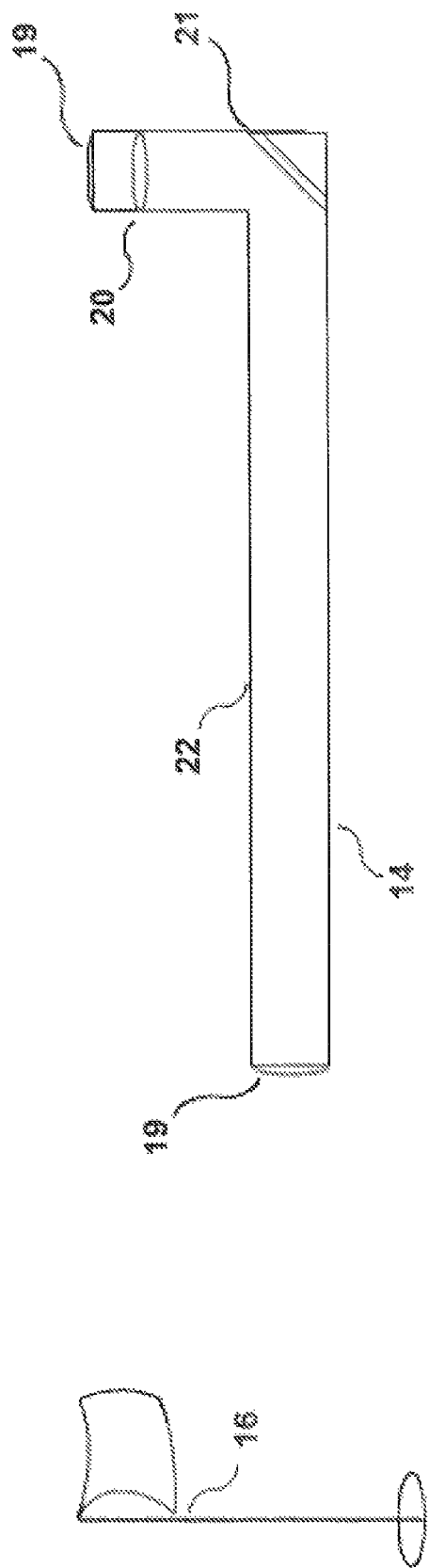
FIG. 4 is an illustrative view of the sighting optics.

Turning now descriptively to the drawings, in which similar reference in characters denote the similar elements throughout the several views, the figures illustrate the Golf Training Apparatus for novice through advanced golfers with regard to the reference numerals used, the following numbering is used throughout the various drawings figures:

1. Information gradient light display array
2. Solar recharging array
3. Solar power converter
4. Laser positioning unit module
5. Power supply
6. Switch array
7. On/Off Switch
8. Mercury level switch
9. Ultrasonic sensor array
10. Ultrasonic sensor module or radar module or accelerometer
11. Sound generator
12. Computer controller
13. Golf training system rail base/Golf training apparatus
14. Sighting optics
15. Golf ball
16. Targeted destination
17. Golfer stance, Golfer's feet
18. Golf club
19. Sighting optics tube dust cover
20. Site tube sights and optics
21. Reflective mirror for the sighting optics
22. Sight tube body

DEFINITIONS

1. The term "information gradient light display array" as used herein, refers to a light display comprised of many different lights or pixels in a screen that can variably and gradiently change color in different patterns or shapes.
2. The term "alignment rail", as used herein, refers to an alignment rail that contains the information gradient light display array and holds the sighting optics that allows the golfer to site the alignment rail to the destination target.
3. The term "the laser positioning unit module", as used herein, refers to a unit that will determine the desired ball location placement by projected light emission of laser lines generated from the alignment rail.
4. The term "sighting optics" as used herein, refers to the ability of the golfer to properly align the golf training system rail base along the intended flight path of the ball to the destination target.
5. The term "golf training apparatus" as used herein, refers to the complete system and all of it's components which work together as a finished unit.
6. The term "golf training system rail base" as used herein, refers to the main body of the golf training apparatus that holds the components in place.
7. The term "out of tolerance" as used herein, refers to the amount that the golf club does not follow the exact path that it should based on the location of the specifications in the computer controller. The exact path should be a straight line towards the destination target.
8. The term "novice golfer" as used herein, refers to a person with average golf skills as defined by the golf industry.
9. The term "advance golfer" as used herein, refers to a person with superior golf skills that has mastered the game but had not yet reached the status as a professional golfer.
10. The term "professional golfer" as used herein, refers to a person that has mastered the game of golf and is a superior player and can earn an income from the sport.
11. The term "tonal communications" as used herein, refers to a tone that will generate a tone that will set the mood of a positive or a negative result.
12. The term "desired swing trajectory path" as used herein, refers to a perfect swing of the golf club in relationship to the golfer's stance, the ball and the desired path for the golf ball.
13. The term "proper swing level and degree of out of tolerance" as used herein, refers to a swing that is not within the desired swing trajectory path and to what degree that it is not within those tolerances.
14. The term "pleasant sounds" as used herein, refers to any audible tone or sound that is pleasant to the human ears and that evoke a feeling of success or pleasantness.
15. The term "unpleasant sounds" as used herein, refers to any audible tone or sound that is mildly irritating or to the human ears and that evoke a feeling of being uncomfortable.
16. The term "predetermined distance from golf training apparatus" as used herein, refers to any mass, either the golf ball or the golfer's feet, which should be located exactly within a certain distance for proper alignment from the golf training system rail base.
17. The term "level and degree of out of tolerance" as used herein, refers to how far from the proper swing level that the golf club travels along.
18. The term "proper destination location" as used herein, refers to the point where the golfer intends for the golf ball to travel to.
19. The term "novice settings" as used herein, refers to easier settings which will allow for a wider margin of error.
20. The term "audio alerts" as used herein, refers to sounds that can be heard by the human ear to alert the golfer to different situations.
21. The term "sonic sensor array" as used herein, refers to any electronic array that will receive information about the golfer's stance or the golf club.
22. The term "radar module" as used herein, refers to today's commercial available methods of detecting distant objects and determining their position, velocity, or other characteristics by analysis of very high frequency radio waves reflected from their surfaces.
23. The term "flight path" as used herein, refers to the straight line between the golf training system rail base and the targeted destination.

Unless otherwise explained, any technical terms used herein have the same meaning as commonly understood by one of ordinary skill in the art to which this disclosure belongs. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references listed in this disclosure are incorporated by reference in their entirety for all purposes. In case of conflict, the present specification, including explanations of terms, will control. In addition, the materials, methods, and examples are illustrative only and not intended to be limiting.

PREFERRED EMBODIMENT

The preferred embodiment of this invention is for use on any golf course.

DETAILED DESCRIPTION

Referring to FIG. 1 is an illustrative view of the present invention.

Referring to FIG. 1 is an illustrative diagram view of the present invention wherein the novice or advance golfer will remove the golf training apparatus 13 and lay it on the ground pointing toward the targeted destination 16. The on-off switch 7 will be turned to the on position so as to power up the computer controller 12. The golfer will now view the destination target through the sighting optics 14. Once the destination target 16 is properly aligned in the sighting optics the golfer may now place a golf ball 15 in the proper designated location by use of the projected light emission of laser lines generated from the laser positioning unit module 4 on the golf training system rail base 13. The two intersecting lasers lines generated from the laser positioning unit module will indicate a position point at a predetermined distance from the golf training system rail base 13 so as to place the golf ball 15 at the proper designated location determined by the computer controller. Once the golf ball is in place the golfer will stand on the opposite side of the golf training apparatus 13 from the golf ball 15 and position his stance.

The golf training apparatus will calculate the position of the golf ball in relationship to the golfer's feet 17 then provide information to the golfer with the information gradient light display array 1 to adjust his stance either forward, backward, closer, farther or wider. Once the optimum stance is achieved calculating with the computer controller 12 then the information gradient light display array 1 will display green lights. The golfer will now swing the golf club 18 so as to strike the ball 15 and drive it towards the targeted destination 16. After the golfer's swing has taken place the computer controller 12 will calculate the speed of the swing utilizing the sound generator 11 and the information that was gathered during the swing. This information will be displayed on the information gradient light display array 1.

It should be understood that the drawings and detailed description herein are to be regarded in an illustrative rather than a restrictive manner, and are not intended to be limiting to the particular forms and examples disclosed. Accordingly, it is intended that this disclosure encompass any further modifications, changes, rearrangements, substitutions, alternatives, design choices, and embodiments as would be appreciated by those of ordinary skill in the art having benefit of this disclosure, and falling within the scope of the following claims.

What is claimed is:

1. An apparatus for training a golf club swing comprising:
   a mounting member including a laser positioning unit module, at least one ultrasonic sensor module, sighting optics and an information gradient light display array;
   a golf ball positioning unit including projected light emission;
   a rail base unit that determines the distance between the golfer's foot and the ball comprising: at least one ultrasonic sensor module, at least one accelerometer; a computer controller interfacing with, the at least one ultrasonic sensor module, the at least one accelerometer, the sighting optics module and the gradient light display array, wherein the computer controller tracks the golf club speed and mechanics of a golf club swing and displays session information via the gradient light display array; and communicates the golfer's recently swung trajectory path information through the gradient light display array where a correct arc swing is represented by a display arc path of gradient green lights, and then the increasingly out of tolerance swing is a display arc path of gradient yellow to red lights will be displayed depicting the swing just made by the golfer and showing the severity of the out of tolerance path swing was with red lights representing the most out of tolerances swings.

2. The apparatus according to claim 1 comprising the computer controller interfaced with the laser positioning unit module.

3. The apparatus according to claim 1 wherein the mounting member comprises the golf training system rail base.

4. The apparatus according to claim 1 comprising a radar module.

5. The apparatus according to claim 1 wherein the computer controller stores and provides statistically information to the golf user.

6. The apparatus according to claim 1 wherein a means for determining distance between the foot and the rail and the ball and the golf training system rail base comprises:
   at least one radar module.

7. The apparatus according to claim 1 wherein sighting optics allow the golfer to align the golf training system rail base along the flight path of the ball to the destination target.

8. The apparatus according to claim 1 wherein the computer controller will calculate the speed of the ball hit by the golf club, will determine the speed of the golf club head, will determine the angle of the club swing moving past the golf training system rail base, will determine information relating to proper stance and desired foot placement in relation to the golf training system rail base, will drive the information gradient light display array, and will provide statistical information to the golfer through the information gradient light display array visually and audibly.

9. The apparatus according to claim 1 wherein the computer controller will communicate correct foot placement and stance to the golf user by unpleasant tones with flashing red arrow lights directing the golf user to adjust for either widening or narrowing the stance, moving one foot or both fee in a direction, moving the golfer's stance further back from the golf training system rail base or closer to the golf training system rail base.

10. The apparatus according to claim 1 wherein the golf training apparatus will be supplementally powered by a solar charging array.

11. The apparatus according to claim 1 wherein the golf training apparatus will utilize a mercury level power on/off switch to ensure when the golf training apparatus is not on a flat surface the golf training apparatus will be powered off.

* * * * *